US007702934B2

(12) United States Patent
Watanabe

(10) Patent No.: US 7,702,934 B2
(45) Date of Patent: Apr. 20, 2010

(54) SEMICONDUCTOR DEVICE AND BIOS AUTHENTICATION SYSTEM

(75) Inventor: Hiroshi Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1202 days.

(21) Appl. No.: 11/266,278

(22) Filed: Nov. 4, 2005

(65) Prior Publication Data

US 2006/0179416 A1    Aug. 10, 2006

(30) Foreign Application Priority Data

Feb. 9, 2005    (JP) .............................. 2005-033360

(51) Int. Cl.
G06F 1/26    (2006.01)
(52) U.S. Cl. ...................... 713/320; 711/104; 713/323; 713/321; 726/36
(58) Field of Classification Search ........................ None
See application file for complete search history.

(56) References Cited

U.S. PATENT DOCUMENTS

| 7,075,284 | B2* | 7/2006 | Watanabe et al. | ........ | 324/76.11 |
| 7,208,933 | B2* | 4/2007 | Watanabe et al. | ........ | 324/76.11 |
| 7,224,157 | B2* | 5/2007 | Watanabe et al. | ........ | 324/76.11 |
| 2006/0179416 | A1* | 8/2006 | Watanabe | ...................... | 716/1 |

FOREIGN PATENT DOCUMENTS

| JP | 07-282163 | 10/1995 |
| JP | 9-307004 | 11/1997 |
| JP | 2001-052125 | 2/2001 |
| JP | 2002-014744 | 1/2002 |
| JP | 2003-157684 | 5/2003 |
| JP | 2004-094922 | 3/2004 |
| JP | 2004-172404 | 6/2004 |
| JP | 2004-326981 | 11/2004 |

OTHER PUBLICATIONS

Bajikar, "Trusted Platform Module (TPM) Based Security on Notebook PCs—White Paper", Intel Corporation, pp. 1-20, (2002).
"Phoenix FirstBIOS", Phoenix Technologies LTD, pp. 1-3, (2005).
Communication mailed by Japanese Patent Office on Sep. 15, 2009 in corresponding Japanese Patent Publication No. 2005-033360, 3 pages.
Communication mailed by Japanese Patent Office on Sep. 15, 2009 in corresponding Japanese Patent Publication No. 2005-033360, 3 pages.

* cited by examiner

*Primary Examiner*—Pramila Parthasarathy
(74) *Attorney, Agent, or Firm*—Finnegan, Henderson, Farabow, Garrett & Dunner, L.L.P.

(57) ABSTRACT

A semiconductor device comprises a semiconductor substrate, a basic module having a memory cell unit composed of first nonvolatile memory cells or a processor unit on a part of the substrate, an authentication module which has second nonvolatile memory cells in an area different from that of the basic module on the substrate, and stores an authentication code, and a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices.

20 Claims, 7 Drawing Sheets

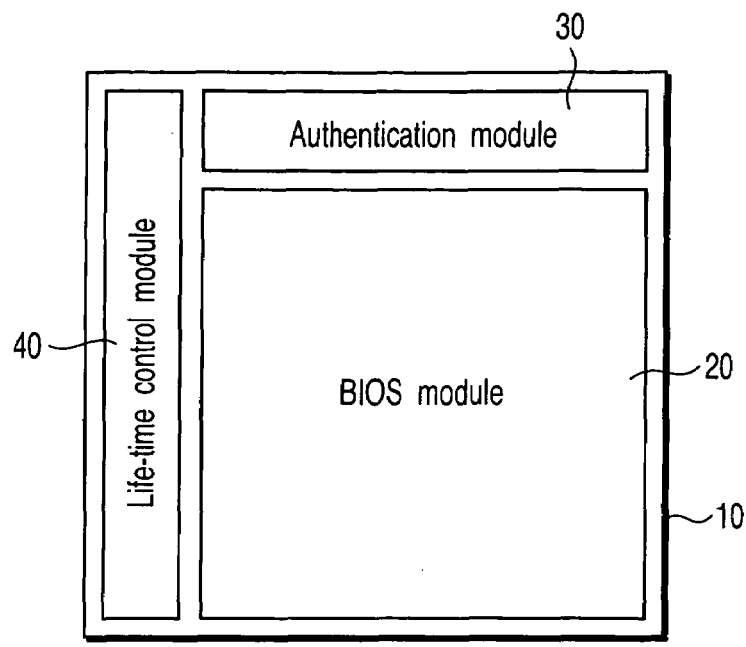
F I G. 1
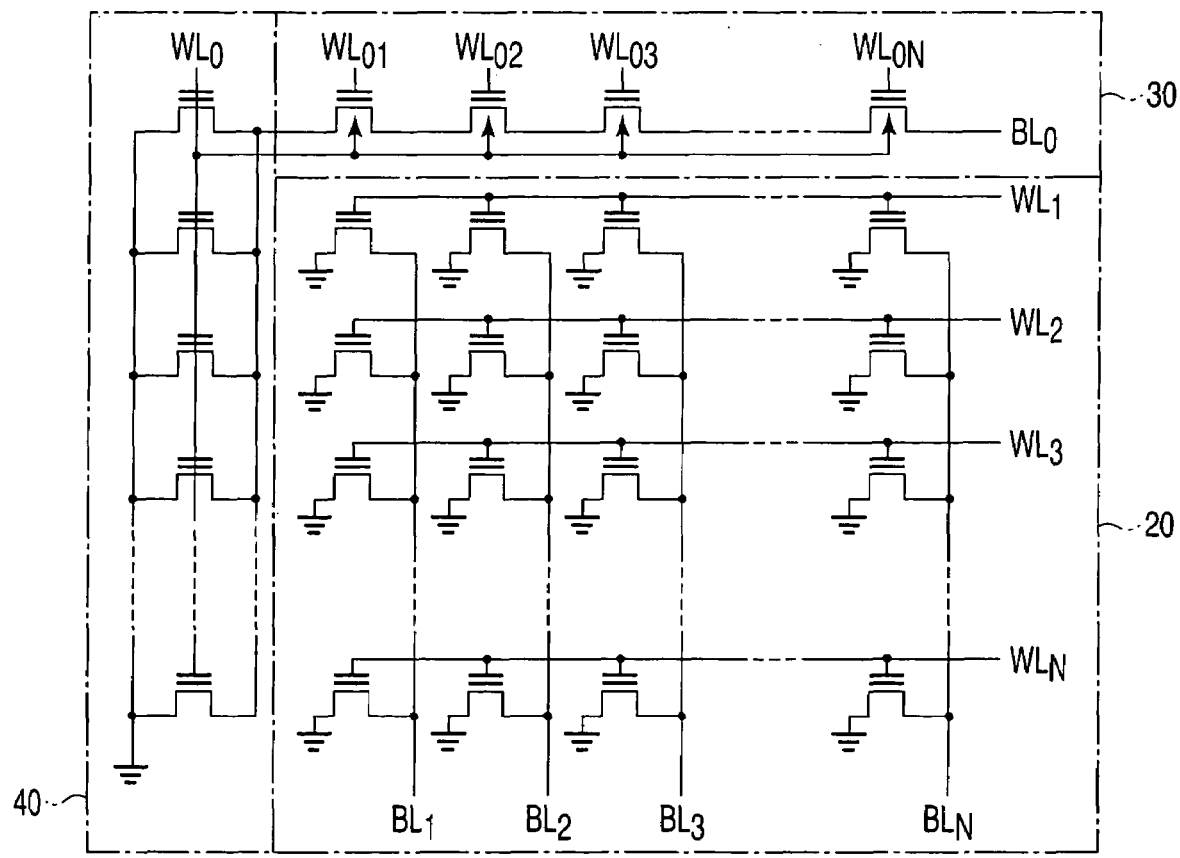
F I G. 2

SEMICONDUCTOR DEVICE AND BIOS AUTHENTICATION SYSTEM

CROSS-REFERENCE TO RELATED APPLICATIONS

This application is based upon and claims the benefit of priority from prior Japanese Patent Application No. 2005-033360, filed Feb. 9, 2005, the entire contents of which are incorporated herein by reference.

BACKGROUND OF THE INVENTION

1. Field of the Invention

The present invention relates to a semiconductor device which limits use of a memory cell unit, a processor unit or the like by a password. In addition, it relates to a BIOS authentication system which limits authentication of a basic input-output system (BIOS) by a password.

2. Description of the Related Art

Today, services through the internet are combined with mobile technology to be used anywhere and anytime, and thus a theft incident of a business mobile (notebook PC or the like) is recognized as a serious threat to network security. For example, access to an in-company network through the stolen mobile is far more serious than that to information recorded in an HDD.

To solve such a problem, there is available a BIOS password technology which applies a password on a BIOS during booting. However, it relies on individual management by a mobile user, and a danger may be increased depending on user's understanding of security. The password of the stolen mobile can be decoded with sufficient time to release locking. This is because the password or its information exists in the HDD.

Against such a background, Intel Corporation has proposed direct mounting of preboot type security in a BIOS in a PC security technology system called a trusted platform module (TPM: http://developer.intel.com/design/mobile/platform/downloads/Trusted Platform Module White Paper.pdf). This trend is similarly observed in US Phoenix Corporation's "cME FistBIOS" which causes a BIOS to recognize a PC on a network (see: http://www.phoenix.com/en/Products/Core+System+Software/Phoenic+cME+FirstBIOS/default.htm).

Conventionally, therefore, there is an urgent social need to establish firm security between a mobile device such as a notebook PC and an infrastructure such as a network, and expectation is now placed on a security technology which incorporates authentication codes in the BIOS. Permission of use by authentication may be applicable not only to BIOS authentication but also to limited use of a processor unit such as a CPU.

Thus, there has been a demand for a semiconductor device which can limit use of a memory cell unit or a processor unit by a password, thereby improving security, or a BIOS authentication system which can limit authentication of BIOS use by a password, thereby improving security.

BRIEF SUMMARY OF THE INVENTION

According to a first aspect of the invention, there is provided a semiconductor device which comprises:

a semiconductor substrate;

a basic module having a memory cell unit composed of first nonvolatile memory cells or a processor unit on a part of the substrate;

an authentication module which has second nonvolatile memory cells in an area different from that of the basic module on the substrate, and stores an authentication code; and a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices.

According to a second aspect of the invention, there is provided a BIOS authentication system which comprises:

a semiconductor substrate;

a BIOS module which has a NOR type memory cell unit formed on a part of the substrate by arranging first nonvolatile memory cells in a row direction and a column direction and which stores BIOS information;

an authentication module which includes a cell array arranged in an area different from that of the BIOS module on the substrate and having second nonvolatile memory cells serially connected in the row direction, and stores an authentication code; and a lifetime control module which includes a cell array of aging devices arranged in an area different from those of the BIOS module and the authentication module on the substrate, having third nonvolatile memory cells as the aging devices connected in parallel in the column direction to be turned on for a fixed period by storage of charges, gates of the third nonvolatile memory cells being connected in common, and connected to a substrate or a well layer of the cell array of the authentication module, and permits reading of the authentication module only during an on-period of the aging devices.

According to a third aspect of the invention, there is provided a computer program product which causes a computer system having a BIOS module, an authentication module, and a lifetime control module to store a computer program instruction to execute BIOS authentication, which comprises:

detecting a BIOS password to initialize the authentication module;

generating a BIOS authentication code from the BIOS password;

acquiring information regarding a predetermined lifetime for the lifetime control module through a network;

setting the lifetime for the lifetime control module;

repeating the steps of generating the BIOS authentication code and thereafter, when the BIOS password is re-input before the lifetime comes to an end; and cutting off the process from the network when the lifetime comes to an end.

BRIEF DESCRIPTION OF THE SEVERAL VIEWS OF THE DRAWING

FIG. 1 is a block diagram showing a basic configuration of a BIOS authentication system according to a first embodiment;

FIG. 2 is a circuit diagram showing a specific configuration of the BIOS authentication system of the first embodiment;

DETAILED DESCRIPTION OF THE INVENTION

According to embodiments of the present invention, by uniting an authentication module and a lifetime control module with a basic module into one chip, it is possible to limit use of a memory cell unit and a processor unit by a password, thereby improving security. To break the security of this system, the disassembly analysis of the chip itself is needed. Moreover, it is possible to inexpensively realize a lifetime controlled BIOS chip (secure BIOS) equipped with an authentication code.

Hereinafter, the present invention will be described in detail by way of illustrated embodiments.

First Embodiment

FIGS. 1 and 2 illustrate a BIOS authentication system according to a first embodiment of the present invention: FIG. 1 is a block diagram showing a basic configuration, and FIG. 2 is a more specific circuit diagram.

Referring to FIG. 1, there are arranged on a Si substrate 10 a BIOS module 20 for storing a BIOS, an authentication module 30 for storing an authentication code regarding the BIOS, and a lifetime control module 40 for controlling a readable period of the authentication module 30.

The authentication module 30 is arranged in a peripheral area along a first side on the substrate 10, and the lifetime control module 40 is arranged in a peripheral area along a second side orthogonal to the first side on the substrate 10. The BIOS module 20 is arranged in an area other than those of the authentication module 30 and the lifetime control module 40. In other words, the authentication module 30 is arranged to be adjacent to one side of the BIOS module 20, and the lifetime control module 40 is arranged to be adjacent to another side of the BIOS module 20.

Referring to FIG. 2, the BIOS module 20 is a NOR type memory cell unit in which nonvolatile memory cells of two-layer configurations having floating and control gates are two-dimensionally arranged in row and column directions, and it can be randomly accessed. The authentication module 30 is a NAND array in which nonvolatile memory cells of two-layer configurations are serially connected in a row direction. The lifetime control module 40 is configured by connecting nonvolatile memory cells of two-layer configurations in parallel in a column direction. Gates of the cells constituting the lifetime control module 40 are connected in common to a substrate or a well area in which each cell of the authentication module 30 is formed.

In FIG. 2, WL0 indicates a word line connected in common to the control gates of the memory cells of the lifetime control module 40, WL01 to WL0N indicate word lines connected to control gates of the memory cells of the authentication module 30, BL0 indicates the bit line connected to the drain side of the end memory cell of the authentication module 30, WL1 to WLN indicate word lines connected to control gates of the memory cells of the BIOS module 20, and BL1 to BLN indicate bit lines connected to source sides of the memory cells of the BIOS module 20.

Figure 3:
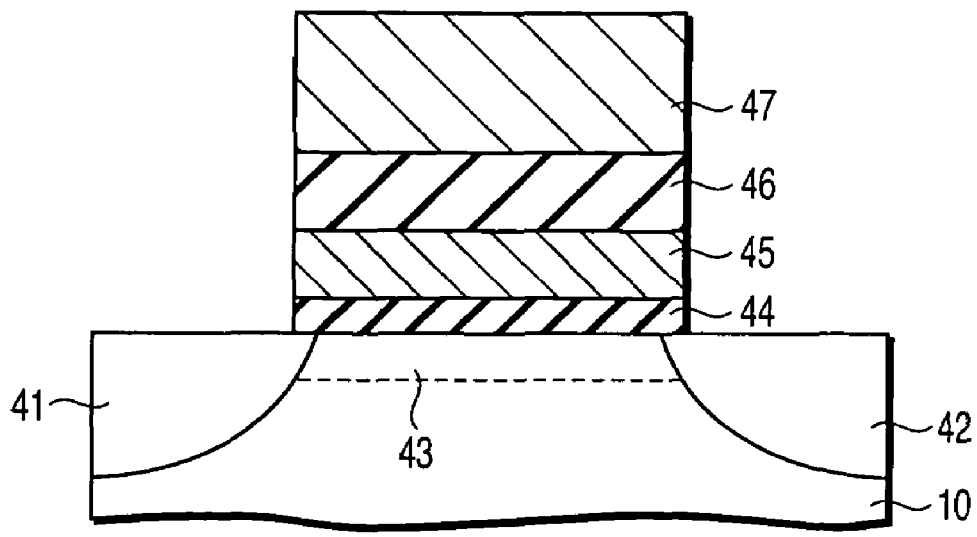
FIG. 3 is a device structure sectional diagram showing an example of a cell transistor which constitutes a lifetime control module.

A cell transistor that constitutes the lifetime control module 40 is configured as shown in FIG. 3 (e.g., see Jpn. Pat. Appln. KOKAI Publication No. 2004-172404 by the same inventors). That is, a source area 41 and a drain area 42 are arranged apart from each other on a surface portion of an Si substrate 10, a floating gate 45 is formed on a channel area 43 between the source and drain areas 41 and 42 via a tunnel insulator 44, and a control gate 47 is formed thereon via an inter-electrode insulator 46. This configuration is basically similar to that of a cell transistor of an EEPROM. The memory cells of the BIOS module 20 and the authentication module 30 are basically similar in configuration to the above.

Figure 4:
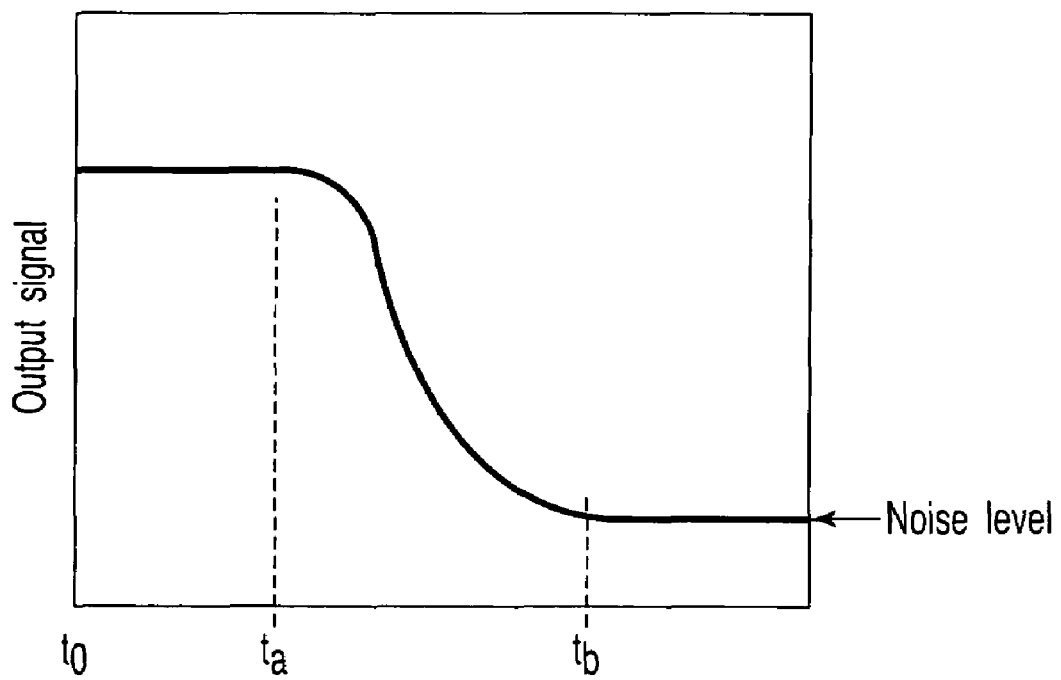
FIG. 4 is a diagram explaining that the device shown in FIG. 3 has a function of a solid-state aging device (SSAD)

FIG. 4 illustrates that a device shown in FIG. 3 has a function of a solid-state aging device (SSAD).

As preprocessing, a high electric field is applied between a substrate interface and the floating gate 45 from the control gate 47 to inject electrons through the tunnel insulator 44 into the floating gate 45 by FN tunneling. The substrate interface is accordingly reversed to concentrate holes, thereby opening the channel in the substrate interface, when the areas 41, 42 are p-type diffusion layers. When the application of the electric field is stopped at time $t_0$, the electric field is gradually reduced by direct tunneling if the tunnel insulator is sufficiently thin, and the channel is closed from time ta to tb to lower an output signal to a noise level. The aging device uses such a time-based change.

That is, power is on for a fixed period of time after the injection of the electrons, and the device is used as the aging device by using this. According to the embodiment, as shown in FIG. 2, stability of an operation is improved by connecting the plurality of cells in parallel. When the tunnel insulator is thick as in the case of the nonvolatile memory, a voltage applied to the control gate 47 is adjusted to generate direct tunneling or weak FN tunneling.

Figure 5:
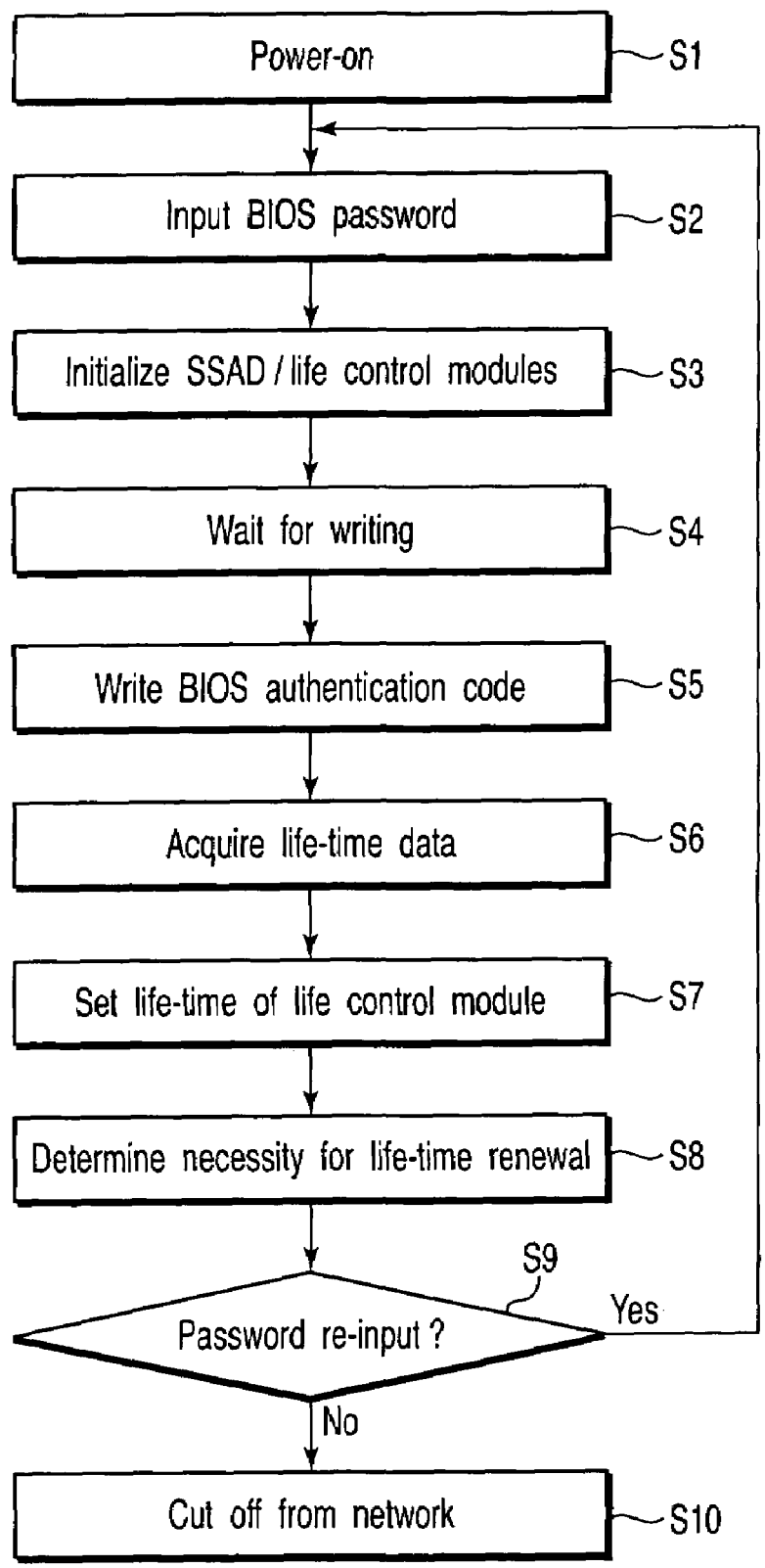
FIG. 5 is a flowchart explaining an operation of the first embodiment.

With this configuration, by combining the BIOS module 20, the authentication module 30, and the lifetime control module 40, it is possible to materialize BIOS security similar to that shown in a flowchart of FIG. 5.

First, for example, after power is turned on for a mobile computer (step S1), a preregistered BIOS password is input (step S2). This password is stored in a RAM, and simultaneously the computer sets the gate WL0 of the lifetime control module 40 high (positive) and the word lines WL01 to WL0N of the authentication module 30 low (negative or 0 V) in accordance with a program. Accordingly, the SSAD of the lifetime control module 40 is charged (lifetime is started after charging-up), and the authentication module 30 is refreshed (step S3). This process is referred to as "initialize" hereinafter.

Subsequently, the gate WL0 of the lifetime control module 40 and the word lines WL01 to WL0N are set to 0 V to realize a state of waiting for writing (step S4). A BIOS authentication code generated from the BIOS password on the computer is written through the word lines WL01 to WL0N and the bit line BL0 (step S5). A server whose services are to be used is accessed through a network to acquire predetermined lifetime information for the authentication (step S6). The acquired lifetime information is st as the lifetime (step 7). In other words, by applying a negative voltage to WL0, positions of ta and tb shown in FIG. 4 can be shifted left to shorten the lifetime of the SSAD.

Then, when processing time is short in one lifetime, re-inputting of a BIOS password for lifetime renewal is considered before the lifetime comes to an end (step S8). After the re-input of the BIOS password is determined in step S9, the process returns to step S2 to repeat steps S2 to S8. If the re-input of the BIOS password is not determined in step S9, and the lifetime comes to an end, the process is cut off from the network (step S10).

In this case, reading of the BIOS authentication code executed as needed during data communication is carried out through WL01 to WL0N and BL0 in a NAND manner. Reading of a BIOS main body is randomly carried out through WL1 to WLN and BL1 to BLN in a NOR manner. The authentication code is left if the process is shut down before the lifetime comes to an end. However, by the operation of inputting the BIOS password during power-on, the previous authentication code is refreshed.

The cell array of FIG. 2 is configured by arranging the memory cells in a lattice shape to obtain the highest degree of integration. According to the embodiment, only by contriving a wiring layout without changing such a cell array, it is possible to lay out the three units of the BIOS, the authentication code, and the SSAD. The BIOS program is recorded in a NOR type area to be randomly accessed. The authentication code is recorded in a row direction in a NAND type area. To counter defective bits, SSAD's are arranged in parallel in a column direction.

It is characteristic that the voltage (WL0) is applied to the SSAD used for the embodiment. In the case of the SSAD of the conventional technology, the thickness of the tunnel insulator 44 is controlled in the power cut-off state to set a lifetime. According to the embodiment, however, it is characteristic that power is supplied, and the lifetime is controlled by WL0. Thus, by setting the tunnel insulator equal in thickness to the authentication code or the BIOS, a normal memory cell can be used. This means that the cells can be simultaneously manufactured by the same design rule. Its advantage is that a load imposed on the manufacturing process by mounting the SSAD is greatly reduced. Accordingly, it is possible to inexpensively provide a BIOS chip equipped with an authentication code even including a SSAD.

Next, consideration will be given to a network connection lifetime. Time necessary for one access such as mail downloading is no more than 2 to 3 minutes. 30 minutes are enough even for downloading a particularly large file. Under these circumstances, a lifetime set for the SSAD is about 30 minutes, and control for the lifetime does not need to be so high. If limited to the use of the above access limitation, about 30±5 minutes may well be permitted. It is not necessary therefore to increase cost to heighten lifetime control.

Thus, according to the embodiment, by comprising the authentication module 30 and the lifetime control module 40 in addition to the BIOS module 20, it is possible to limit the authentication of the BIOS by the password, thereby improving security. Moreover, in this case, as the authentication code is held in the memory cell in which the readable period is limited, no authentication code is left in the HDD. The authentication code in the BIOS chip is refreshed during booting. Thus, even if a theft incidence of a notebook PC or the like occurs, it is possible to prevent access to the in-company network from the PC.

Figure 6:
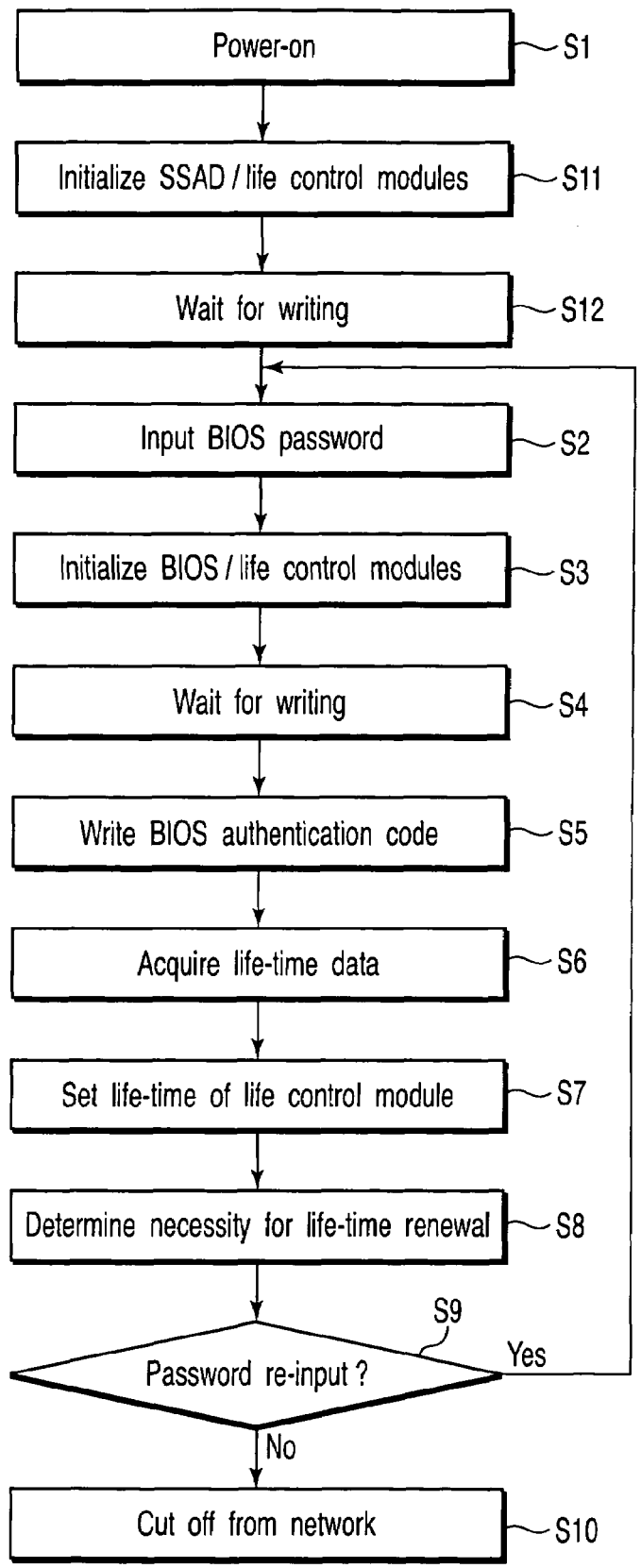
FIG. 6 is a flowchart explaining an operation of a modified example of the first embodiment.

Furthermore, as shown in FIG. 6, it is possible to further improve security by refreshing the authentication module before the BIOS password is input.

Second Embodiment

Figure 7:
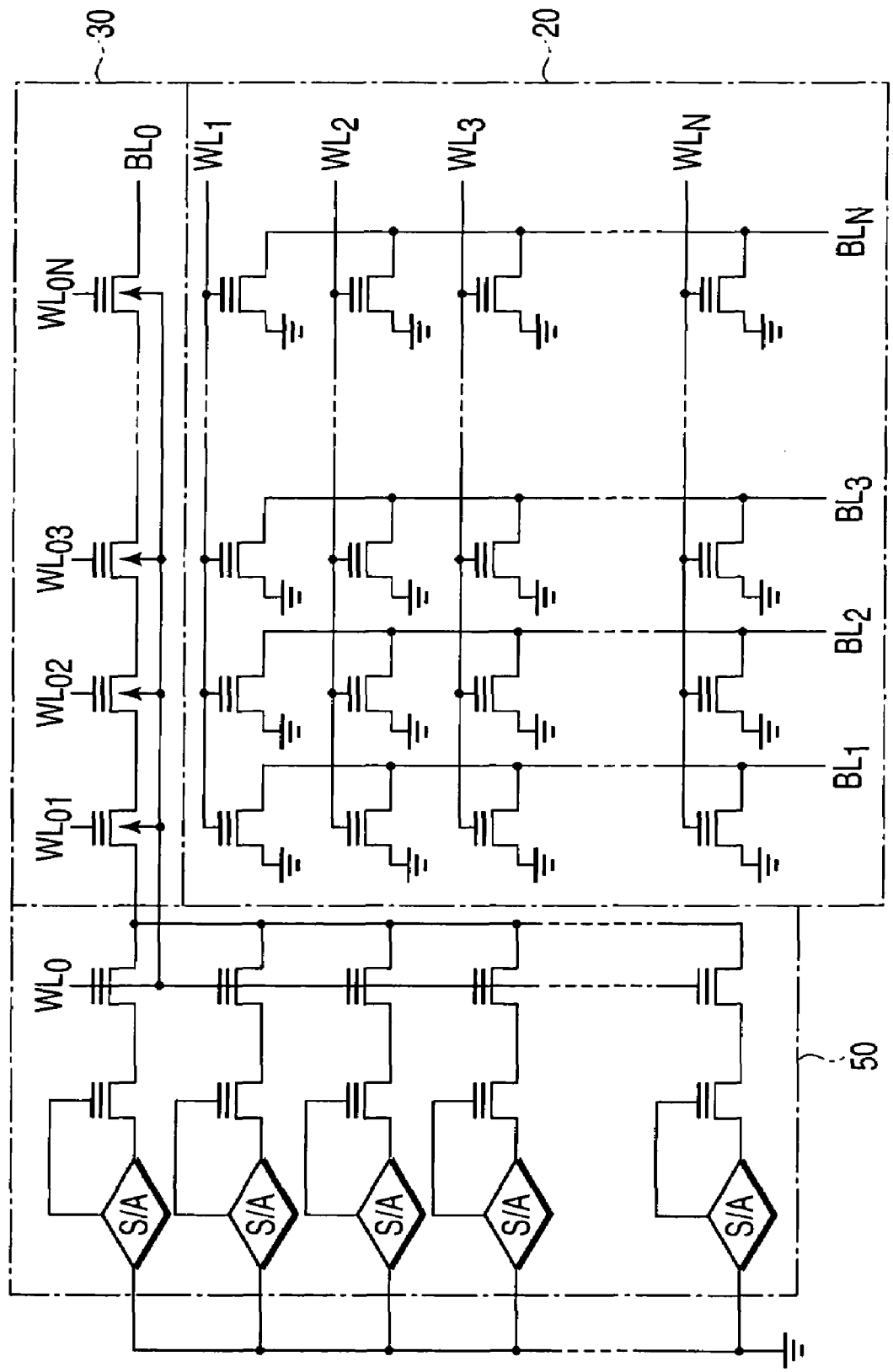
FIG. 7 is a circuit diagram showing an example of a BIOS unit equipped with an authentication code in which lifetime controllability is improved by a trimming circuit, to explain a BIOS authentication system according to a second embodiment.

FIG. 7 is a circuit diagram showing a BIOS authentication system according to a second embodiment of the present invention. Parts similar to those of FIG. 2 are denoted by similar reference numerals, and detailed description thereof will be omitted.

According to the embodiment, contrivance to improve lifetime controllability is added by taking into consideration a possibility of expanding the technology of the first embodiment or the like from the BIOS in the future.

Referring to FIG. 7, a basic unit of a lifetime control module 50 comprises, instead of one nonvolatile memory cell, an SSAD cell as an aging device, a cell having a breaker function, and a sense amplifier. Such basic units are connected in parallel in a column direction.

When a current conducted to the sense amplifier is not contained within a fixed range, the breaker is thrown to cut off the SSAD cell from the parallel circuit. For example, this is application of a trimming technology proposed in a Document (Jpn. Pat. Appln. KOKAI Publication No. 2004-94922 by the same applicant of the invention). The sense amplifier part may be formed in the lifetime control module 50, or included in a peripheral circuit such as a decoder.

With this configuration, as the cells that vary from the others are cut off, it is possible to improve lifetime controllability.

Figure 8:
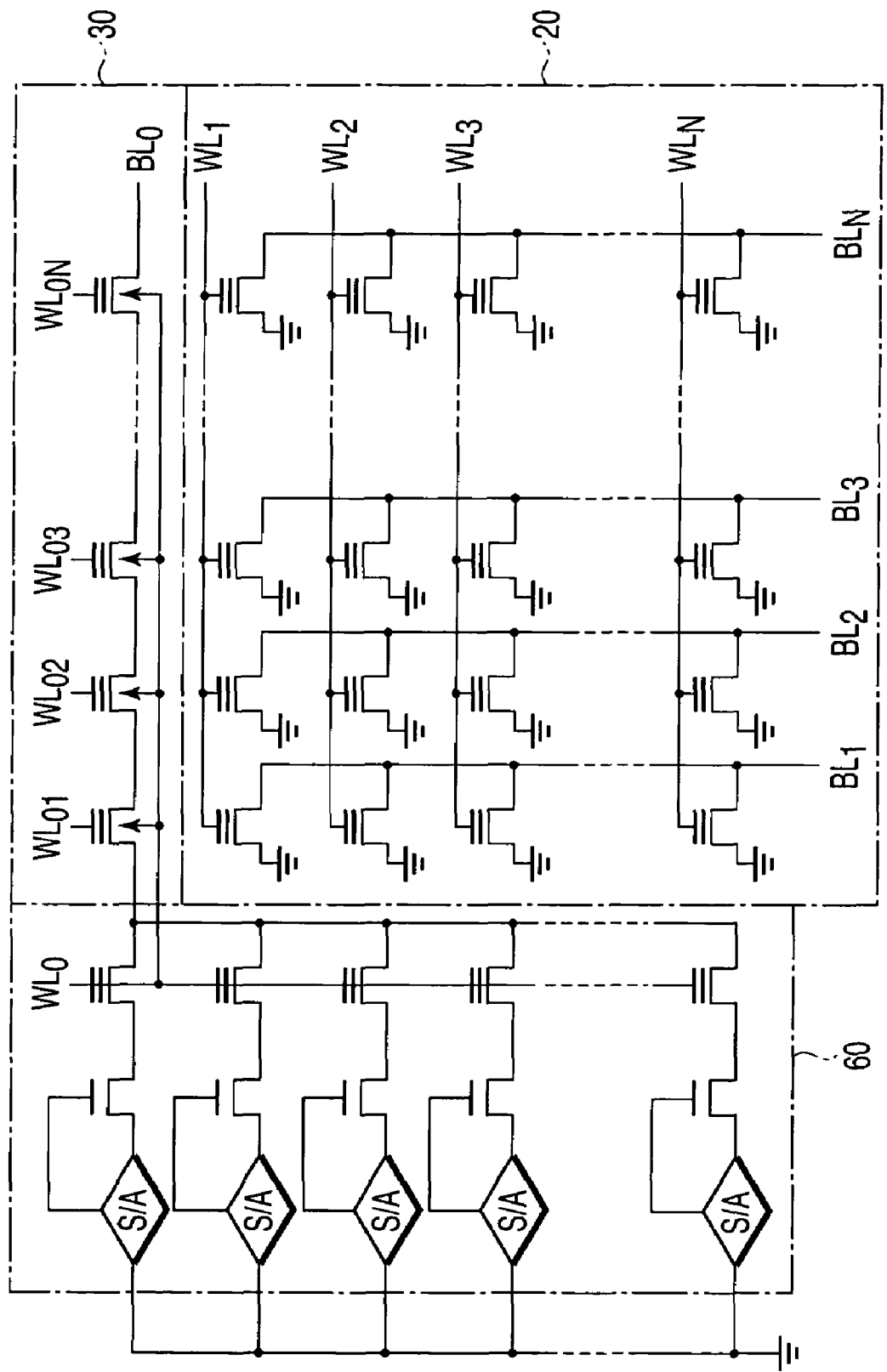
FIG. 8 is a circuit diagram showing another example of a BIOS unit equipped with an authentication code in which lifetime controllability is improved by a trimming circuit.
Figure 9A:
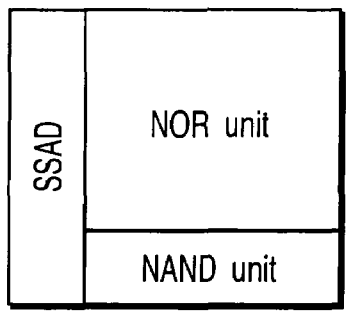
FIGS. 9A to 9F are diagrams showing layout examples of a lifetime controlled BIOS unit equipped with an authentication code according to a third embodiment.
Figure 9B:
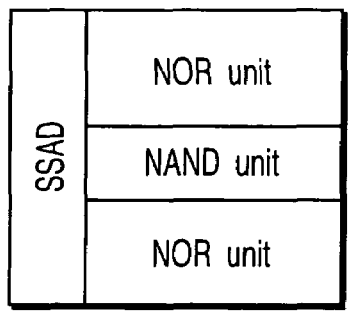
Figure 9C:
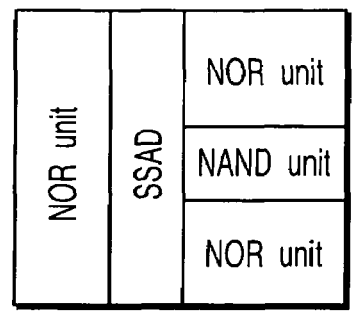
Figure 9D:
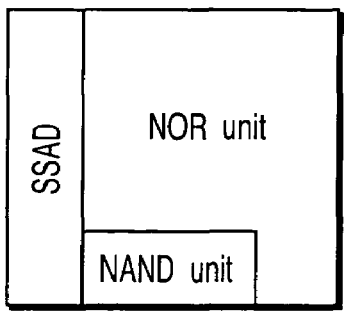
Figure 9E:
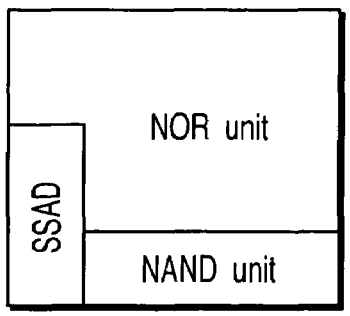
Figure 9F:
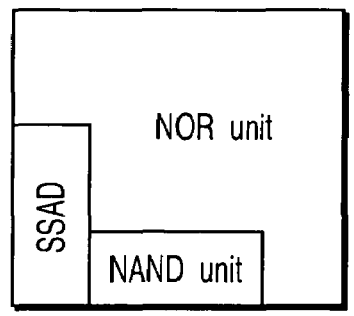

In place of the nonvolatile memory cell as the breaker shown in FIG. 7, a MOS transistor can be used as a breaker as shown in FIG. 8. Even when such a lifetime control module 60 is used, effects similar to the above can be obtained.

Third Embodiment

FIGS. 9A to 9F are block diagrams of a basic configuration of a BIOS authentication system according to a third embodiment of the present invention, showing modified examples of unit layouts.

A feature of the embodiment is that an SSAD unit (parallel array) as a lifetime control module and an authentication code unit (NAND array) are separated in row and column directions, or column and row directions, and a remaining portion is occupied by a BIOS unit (NOR array) to realize efficient integration. According to the embodiment, any layout is possible as long as this feature is maintained.

The authentication code is preferably an encoded code or a decoding key for decoding the encoded authentication code, which is generated according to a BIOS password after it is input. Preferably, in this case, an authentication code stored in an authentication code area (authentication module) is an encoded code or a decoding key.

MODIFIED EXAMPLE

The present invention is not limited to the foregoing embodiments. The basic module of the embodiment is not always limited to the NOR type memory cell unit which stores the BIOS. It may be a memory unit which stores data other than the BIOS. It may be a memory cell unit which stores video data. In place of the memory cell unit, a processor unit such as a CPU can be arranged. In this case, unless a password is authenticated, the CPU cannot be used, and even a PC cannot be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
a semiconductor substrate;
a basic module having a memory cell unit composed of first nonvolatile memory cells or a processor unit on a part of the substrate;
an authentication module which has second nonvolatile memory cells in an area different from that of the basic module on the substrate, and stores an authentication code; and
a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices.

2. The semiconductor device according to claim 1, wherein each of the third nonvolatile memory cells constituting the aging devices of the lifetime control module has a two-layer gate configuration which includes a floating gate formed on the substrate via a tunnel insulator and a control gate formed on the floating gate via an inter-electrode insulator, and is turned on only for a fixed period after charges are stored in the floating gate.

3. The semiconductor device according to claim 1, wherein the lifetime control module is configured by connecting in parallel basic units, each of the basic units having two serially connected nonvolatile memory cells and a sense amplifier to turn off one of the nonvolatile memory cells when a current conducted to the nonvolatile memory cells is out of a fixed range.

4. The semiconductor device according to claim 1, wherein the lifetime control module is configured by connecting in parallel basic units, each of the basic units having a serial connection part in which a nonvolatile memory cell as one of the aging devices and a MOS transistor are serially connected, and a sense amplifier to turn off the MOS transistor when a current conducted to the serial connection part is out of a fixed range.

5. The semiconductor device according to claim 1, wherein the basic module is a NOR nonvolatile memory cell unit in which the first nonvolatile memory cells are arranged in a row direction and a column direction and which stores BIOS information.

6. The semiconductor device according to claim 5, wherein the memory cells constituting the basic module, the authentication module, and the lifetime control module are formed by the same design rule.

7. The semiconductor device according to claim 1, wherein the authentication module and the lifetime control module are arranged in directions orthogonal to each other.

8. A semiconductor device comprising;
a semiconductor substrate;
a basic module having a memory cell unit composed of first nonvolatile memory cells or a processor unit on a part of the substrate;
an authentication module which has second nonvolatile memory cells in an area different from that of the basic module on the substrate, and stores an authentication code; and
a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices, wherein
the authentication module has a cell array in which the second nonvolatile memory cells are serially connected in a row direction,
the aging devices of the lifetime control module are formed as a cell array in which the third nonvolatile memory cells are connected in parallel in a column direction, and gates of the aging devices are connected in common,
the cell array of the aging devices is inserted between a source line and an earth end of the cell array of the authentication module, and
the gates of the aging devices are connected to a substrate or a well layer of the cell array of the authentication module.

9. The semiconductor device according to claim 8, wherein the basic module is arranged in a rectangular shape, the authentication module is arranged to be adjacent to a first side of the basic module, and the lifetime control module is arranged to be adjacent to a second side orthogonal to the first side of the basic module.

10. A semiconductor device comprising:
a semiconductor substrate;
a basic module having a memory cell unit composed of first nonvolatile memory cells or a processor unit on a part of the substrate;
an authentication module which has second nonvolatile memory cells in an area different from that of the basic module on the substrate, and stores an authentication code; and
a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices, wherein
the authentication module has a cell array in which the second nonvolatile memory cells are serially connected in a row direction,
the aging devices of the lifetime control module are formed as a cell array in which the third nonvolatile memory cells are connected in parallel in a column direction. and gates of the aging devices are connected in common,
the cell array of the aging devices is inserted between a source line and an earth end of the cell array of the authentication module,
the gates of the aging devices are connected to a substrate or a well layer of the cell array of the authentication module, and
the authentication module and the lifetime control module are arranged in directions orthogonal to each other.

11. A semiconductor device comprising:
a semiconductor substrate;
a basic module having a memory cell unit composed of first nonvolatile memory cells or a processor unit on a part of the substrate;
an authentication module which has second nonvolatile memory cells in an area different from that of the basic module on the substrate, and stores an authentication code; and
a lifetime control module which has aging devices configured by third nonvolatile memory cells in an area different from those of the basic module and the authentication module on the substrate, and which is turned on for a fixed period by storage of charges and permits reading of the authentication module only during an on-period of the aging devices, wherein the authentication module has a cell array in which the second nonvolatile memory cells are serially connected in a row direction, the aging devices of the lifetime control module are formed as a cell array in which the third nonvolatile memory cells are connected in parallel in a column direction, and gates of the aging devices are connected in common, the cell array of the aging devices is inserted between a source line and an earth end of the cell array of the authentication module, the gates of the aging devices are connected to a substrate or a well layer of the cell array of the authentication module, and the basic module is arranged in a rectangular shape, the authentication module is arranged to be adjacent to a first side of the basic module, and the lifetime control module is arranged to be adjacent to a second side orthogonal to the first side of the basic module.

12. A BIOS authentication system comprising:
a semiconductor substrate;
a BIOS module which has a NOR type memory cell unit formed on a part of the substrate by arranging first nonvolatile memory cells in a row direction and a column direction and which stores BIOS information;
an authentication module which includes a cell array arranged in an area different from that of the BIOS module on the substrate and having second nonvolatile memory cells serially connected in the row direction, and stores an authentication code; and
a lifetime control module which includes a cell array of aging devices arranged in an area different from those of the BIOS module and the authentication module on the substrate, having third nonvolatile memory cells as the aging devices connected in parallel in the column direction to be turned on for a fixed period by storage of charges, gates of the third nonvolatile memory cells being connected in common, and connected to a substrate or a well layer of the cell array of the authentication module, and permits reading of the authentication module only during an on-period of the aging devices.

13. The BIOS authentication system according to claim 12, wherein the authentication code is created based on a BIOS password and, at a time of inputting the BIOS password, gates of the nonvolatile memory cells of the lifetime control module are driven to initialize previous authentication codes.

14. The BIOS authentication system according to claim 12, wherein a lifetime of the authentication code given to the cell array is controlled through a network.

15. The BIOS authentication system according to claim 12, wherein the nonvolatile memory cells constituting the aging devices of the lifetime control module have a two-layer gate configuration which includes a floating gate formed on the substrate via a tunnel insulator and a control gate formed on the floating gate via an inter-electrode insulator, and are turned on only for a fixed period after charges are stored in the floating gate.

16. The BIOS authentication system according to claim 12, wherein the lifetime control module is configured by connecting in parallel a plurality of basic units each having two serially connected nonvolatile memory cells and an amplifier to turn off one of the nonvolatile memory cells when currents conducted to the two serially connected nonvolatile memory cells are out of a fixed range.

17. The BIOS authentication system according to claim 12, wherein the lifetime control module is configured by connecting in parallel a plurality of basic units each having a serial connection part in which a nonvolatile memory cell as one of the aging devices and a MOS transistor are serially connected, and a sense amplifier to turn off a gate of the MOS transistor when a current conducted to the serial connection part is out of a fixed range.

18. A BIOS authentication system comprising:
a semiconductor substrate;
a BIOS module which has a NOR type memory cell unit formed on a part of the substrate by arranging first nonvolatile memory cells in a row direction and a column direction and which stores BIOS information;
an authentication module which includes a cell array arranged in an area different from that of the BIOS module on the substrate and having second nonvolatile memory cells serially connected in the row direction, and stores an authentication code; and
a lifetime control module which includes a cell array of aging devices arranged in an area different from those of the BIOS module and the authentication module on the substrate, having third nonvolatile memory cells as the aging devices connected in parallel in the column direction to be turned on for a fixed period by storage of charges. gates of the third nonvolatile memory cells being connected in common, and connected to a substrate or a well layer of the cell array of the authentication module, and permits reading of the authentication module only during an on-period of the aging devices, wherein
the authentication module and the lifetime control module are arranged in directions orthogonal to each other.

19. A computer program product tangibly embodied in a computer-readable storage medium, the computer program product including instructions for execution by a processor to perform a method for causing a computer system having a BIOS module, an authentication module, and a lifetime control module to execute BIOS authentication, the method comprising:
detecting a BIOS password to initialize the authentication module;
generating a BIOS authentication code from the BIOS password;
acquiring information regarding a predetermined lifetime for the lifetime control module through a network;
setting the lifetime for the lifetime control module;
repeating the steps of generating the BIOS authentication code and thereafter, when the BIOS password is re-input before the lifetime comes to an end; and
cutting off the process from the network when the lifetime comes to an end.

20. The computer program product according to claim 19, further comprising executing initialization of the authentication module before the BIOS password is input after power is turned on.

* * * * *

UNITED STATES PATENT AND TRADEMARK OFFICE
CERTIFICATE OF CORRECTION

| | | |
|---|---|---|
| PATENT NO. | : 7,702,934 B2 | Page 1 of 1 |
| APPLICATION NO. | : 11/266278 | |
| DATED | : April 20, 2010 | |
| INVENTOR(S) | : Watanabe | |

It is certified that error appears in the above-identified patent and that said Letters Patent is hereby corrected as shown below:

Claim 8, column 7, line 54, change "comprising;" to --comprising:--.

Claim 10, column 8, line 45, change "direction." to --direction,--.

Claim 18, column 10, line 30, change "charges." to --charges,--.

Signed and Sealed this

Fifteenth Day of June, 2010

David J. Kappos
*Director of the United States Patent and Trademark Office*